No. 686,546. Patented Nov. 12, 1901.
C. SEYMOUR.
SPOKE TENONING AND CUT-OFF MACHINE.
(Application filed Apr. 24, 1901.)

(No Model.) 3 Sheets—Sheet 1.

WITNESSES:
Edward Thorpe

INVENTOR
Charles Seymour
BY
ATTORNEYS

No. 686,546. Patented Nov. 12, 1901.
C. SEYMOUR.
SPOKE TENONING AND CUT-OFF MACHINE.
(Application filed Apr. 24, 1901.)
(No Model.) 3 Sheets—Sheet 2.

WITNESSES:
Edward Thorpe

INVENTOR
Charles Seymour
By
ATTORNEYS

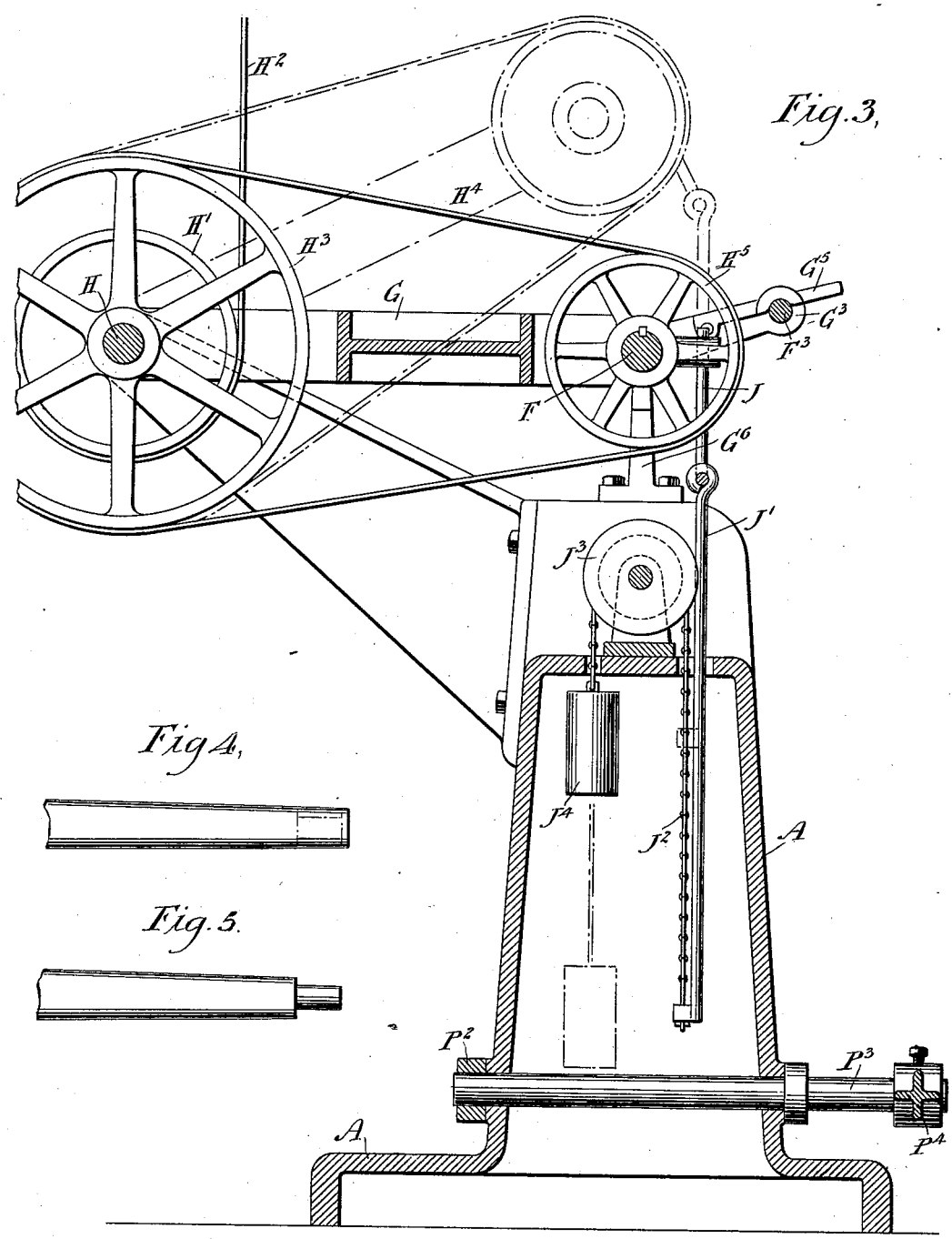

UNITED STATES PATENT OFFICE.

CHARLES SEYMOUR, OF DEFIANCE, OHIO, ASSIGNOR TO THE DEFIANCE MACHINE WORKS, OF DEFIANCE, OHIO, A CORPORATION OF OHIO.

SPOKE TENONING AND CUT-OFF MACHINE.

SPECIFICATION forming part of Letters Patent No. 686,546, dated November 12, 1901.

Application filed April 24, 1901. Serial No. 57,249. (No model.)

*To all whom it may concern:*

Be it known that I, CHARLES SEYMOUR, a citizen of the United States, and a resident of Defiance, in the county of Defiance and State of Ohio, have invented a new and Improved Spoke Tenoning and Cut-Off Machine, of which the following is a full, clear, and exact description.

The invention relates to woodworking machinery; and the object is to provide a new and improved spoke tenoning and cut-off machine designed for the use of wagon-builders and heavy-truck builders and arranged to cut off the tread ends of the spokes to equal length and reduce a wheel to the proper diameter, to cut the tenons of any desired size on the ends of the cut-off spokes, and to finish the ends complete to receive the fellies.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
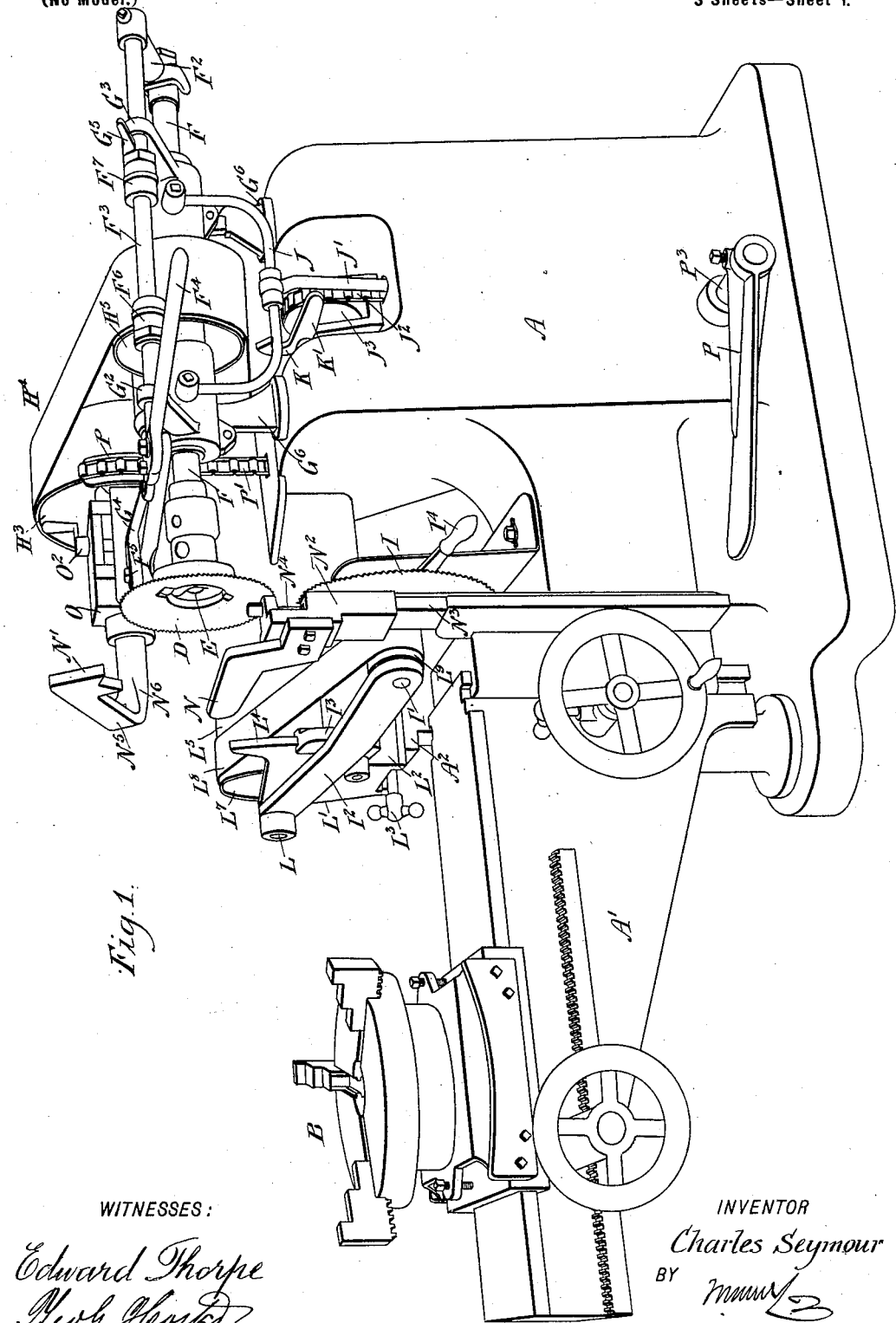
Figure 2:
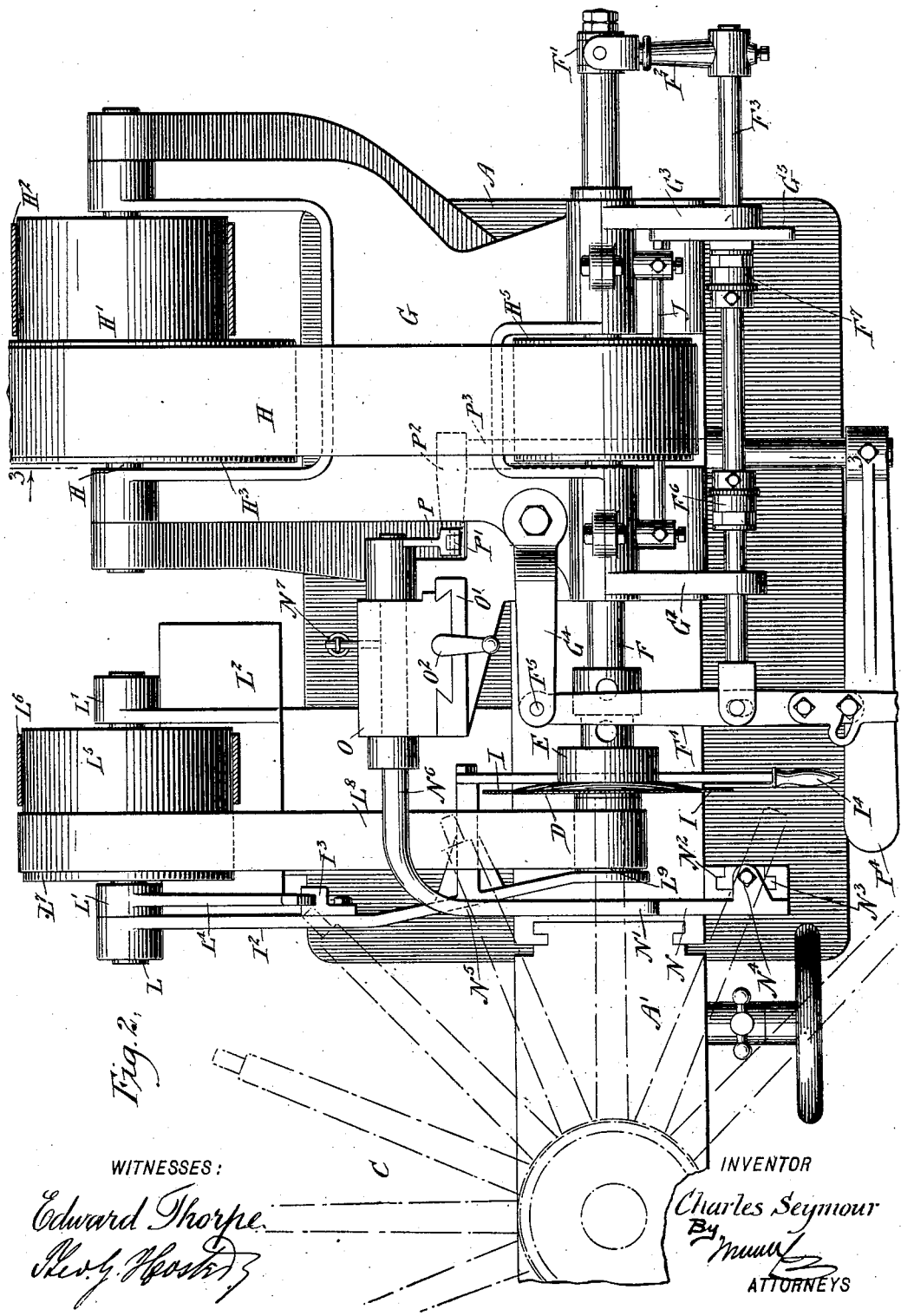

Figure 1 is a perspective view of the improvement. Fig. 2 is an enlarged plan view of the same. Fig. 3 is a transverse section of the same on the line 3 3 in Fig. 2. Fig. 4 is a side elevation of a spoke previous to cutting off the end and forming the tenon; and Fig. 5 is a like view of the spoke, showing the finished tenon.

On an extension A' of the bed A is adjustably mounted a chuck B for revolubly supporting a wheel C, the spokes of which are successively cut off at the tread end to the proper length by a circular dished saw D, held on a cutter-head E, used for forming the tenon on the cut-off end of the spoke, said cutter-head being secured on one end of a spindle F, mounted to turn and to slide in bearings carried on a frame G, as is plainly illustrated in the drawings. The cutter-head E and the saw D may be of any approved construction, preferably, however, like the one shown and described in the Letters Patent of the United States, No. 446,476, granted to me February 17, 1891.

The frame G is mounted to swing loosely on a shaft H, journaled in suitable bearings carried on the bed A, and on said shaft is secured a pulley H', connected by a belt $H^2$ with other machinery for rotating said shaft H. The latter drives the spindle F, and for this purpose the shaft H is provided with a pulley $H^3$, connected by a belt $H^4$ with a pulley $H^5$, arranged on the spindle F and extending in the forked end of the frame G, said spindle F being mounted to turn with and to slide in the pulley $H^5$. Thus when the shaft H is rotated the pulley $H^3$, belt $H^4$, and pulley $H^5$ impart a rotary motion to the spindle F to rotate the cutter-head E and the saw D to cut off the ends of the spokes of the wheels C and to form the tenons on the cut-off ends of the spokes, as above mentioned and hereinafter more fully described.

The outer or rear end of the spindle F carries a shifting collar F', engaged by a shifting fork $F^2$, secured on one end of a rod $F^3$, mounted to slide in bearings $G^2$ $G^3$, projecting forwardly from the frame G, as is plainly illustrated in Figs. 1 and 2. The forward end of the rod $F^3$ is pivotally connected with a shifting lever $F^4$, fulcrumed at $F^5$ on a bracket $G^4$, secured to the frame G, and said shifting lever $F^4$ is under the control of the operator, so that when the latter moves the lever $F^4$ from the right to the left the spindle F is shifted in a like direction to feed the cutter-head E upon the end of the cut-off spoke and form a tenon thereon. When the tenon is finished, then the lever $F^4$ is swung from the left to the right to disengage the cutter-head from the tenon and to bring the saw D into a proper cutting-off position and cut off the end of the next following spoke, the wheel C being turned correspondingly by the operator.

The shifting of the spindle F is limited by stops $F^6$ $F^7$, adjustably secured by set-screws on the rod $F^3$, the stop $F^6$ being adapted to abut against a bearing $G^2$ when the shifting lever $F^4$ is moved from the right to the left, and the stop $F^7$ is adapted to abut against an arm $G^5$, fulcrumed on the bearing $G^3$, when the lever $F^4$ is swung from the left to the right, and in case the arm $G^5$ is swung rearward out of the path of the stop $F^7$ then this latter arrangement is necessary to allow the spindle F, cutter-head E, and saw D to move farther away from the wheel C when a finished wheel is to be removed from the chuck B and a new wheel is to be placed in position. Use is made of an auxiliary saw I for cutting off the first spoke of a low heavy wheel having spokes so close together that the dished or concave saw D cannot enter between adjacent spokes, as hereinafter more fully described.

The frame G when in a horizontal position rests with its free end on rests $G^6$, secured to the top of the bed A, and said frame, with the parts carried thereon, is counterbalanced to permit of conveniently swinging the frame into an upward position, as indicated in dotted lines in Fig. 3, whenever it is desired to change the wheels on the chuck B.

In order to counterbalance the frame G, the following device is provided: On the free end of the frame G is secured a depending bail J, on which is hung a link J', connected with one end of a chain, cable, or rope $J^2$, extending upwardly and passing over a pulley $J^3$, journaled in the upper portion of the bed A, the end of said chain supporting a weight $J^4$ for counterbalancing the frame G and the parts mounted thereon. The frame G is normally locked in place on rests $G^6$ by a hook K, engaging the bail J, said hook K having a forwardly-extending arm K', adapted to be taken hold of by the operator to swing the hook K into or out of engagement with the bail J and lock or unlock the frame G.

The auxiliary saw I, previously mentioned, is located below the saw D and stands in the same transverse plane with the saw D when the latter is in a cutting position—that is, when the stop $F^7$ abuts against the arm $G^5$, as above described. The auxiliary saw I, which is preferably circular, has its arbor I' journaled in an arm $I^2$, loosely fulcrumed on a shaft L, journaled in bearings L' L', rising from a saddle $L^2$, longitudinally adjustable by a screw-rod $L^3$ on guideways $A^2$ of the bed A, as is plainly indicated in Fig. 1. On one of the bearings L' is secured or formed a segment $L^4$, engaged by a guideway $I^3$ on the arm I, so as to steady the latter and prevent wabbling of the saw I when the latter is rotated. On the arm $I^2$ is secured a forwardly-extending handle $I^4$, adapted to be taken hold of by the operator to swing the arm $I^2$ and bring the auxiliary saw I into position for cutting off the end of the first spoke on a new wheel C. The saw I is driven from the shaft L, and for this purpose the latter is provided with a pulley $L^5$, connected by a belt $L^6$ with other machinery, for imparting a rotary motion to the shaft L, and this rotary motion is transmitted by a pulley $L^7$ and belt $L^8$ to a pulley $L^9$, secured on the arbor I' of the auxiliary saw I. The spoke under treatment at the time is held firmly in position on a rest N by a V-shaped jaw N', straddling the top of the spoke, said rest N being secured on a sleeve $N^2$, mounted to slide vertically on a bar $N^3$, bolted or otherwise fastened to the bed A.

The sleeve $N^2$ is vertically adjustable on the bar $N^3$ by a screw-rod $N^4$, as indicated in Fig. 1. Thus by turning the screw-rod $N^4$ the sleeve $N^2$, with the rest N, is raised or lowered, according to the direction in which the screw-rod $N^4$ is turned, to bring the top of the rest N in proper relation with the under side of the spoke for the latter to rest on said rest N. The jaw N' is formed on an arm $N^5$, secured to or formed on one end of a shaft $N^6$, pressed on by a spring $N^7$ to hold the jaw N' normally in an uppermost position—that is, out of engagement with the top of the spoke. The shaft $N^6$ is journaled in bearings O, mounted to slide vertically in a guideway O', held on the bed A, the vertical adjustment of the bearing being made by a suitable screw-rod $O^2$, so as to bring the jaw N' when swung downward always in a proper position relatively to the spoke.

On the shaft $N^6$ is secured a segmental arm P, engaged by the upper end of a chain P', connected at its lower end to an arm $P^2$, fastened on the inner end of a shaft $P^3$, journaled in suitable bearings in the lower portion of the bed A, and on the outer end of said shaft $P^3$ is secured a treadle $P^4$, adapted to be pressed by the operator's foot to impart a turning motion to the shaft $P^3$ and swing the arm $P^2$ downward to cause the chain P' to pull the arm P downward and turn the shaft $N^6$, so that the arm $N^5$ swings downward and the jaw N' moves in engagement with and straddles the top of the spoke resting at the time on the rest N. When this takes place, the spoke stands in axial alinement with the spindle F.

The operation is as follows: When a low heavy wheel having spokes close together is to be treated, then the operator first swings the arm $G^5$ upward and rearward and then moves the lever $F^4$ farther to the right until the stop $F^7$ abuts against the arm $G^5$, and then the operator unlocks the frame G by disengaging the hook K from the bail J. The operator now swings the frame G upward and rearward into the position shown in dotted lines in Fig. 3. The wheel mentioned is now placed in position on the chuck B and turned to bring one of its spokes on the rest N, and then the operator presses the treadle $P^4$ and swings the jaw N' into engagement with the spoke on the rest to finally center the spoke and hold it in place for the time being. The operator now takes hold of the handle $I^4$ and swings the arm $I^2$ upward to cause the driven circular saw to cut off the end of the spokes to the proper length. When this has been done, the operator swings the arm $I^2$ back to bring the saw I into a lowermost inactive position, in which said saw remains until the wheel is finished and removed from the chuck B and another wheel of a like character is placed in position on the chuck. Thus it will be understood that the function of the saw I is only to cut off the first spoke of each wheel, while the remaining spokes of the wheel are cut off by the concaved or dished saw D, as hereinafter more fully described. When the saw I is in its lowermost position, then the operator swings the frame G downward and locks it in place on the rests G⁶ by moving the hook K into engagement with the bail J, and then the operator gradually moves the lever F⁴ to the left to shift the spindle F correspondingly, and thereby feed the cutter-head E upon the end of the spoke to form the tenon thereon. The stop F⁶ finally moves in engagement with the bearing G² to prevent further feeding of the cutter-head on the end of the spoke. By adjusting the stop F⁶ on the rod F³ the distance the cutter-head moves upon the end of the spoke is varied to cut tenons of different lengths for different wheels. During the operation of forming the tenon on the end of the spoke the operator throws the arm G⁵ down into the normal position, (shown in Figs. 2 and 3,) so that when the tenon is finished and the operator moves the lever F⁴ to the right then the stop F⁷ finally abuts against the arm G⁵, and when this takes place the cutter-head E is free from the tenon, and the saw D stands in vertical alinement with the saw I. The operator now releases the treadle P⁴ for the jaw N' to unlock the spoke, and the wheel is now turned to bring the next spoke into engagement with the saw D for the latter to cut off the end of this second spoke to the same length as the saw I cut off the first spoke. When the end of the second spoke is cut off and the latter has been moved into a horizontal position relatively to the spindle F, then the operator presses the treadle P⁴ and locks the second spoke in place, and then the operator swings the lever F⁴ to the left and feeds the cutter-head upon the second spoke to form the tenon thereon. When this has been done, the operator moves the lever to the right until the stop F⁷ abuts against the arm G⁵, and then the operator releases the treadle to unlock the second spoke, after which the wheel C is again turned to bring the third spoke in engagement with the saw D for the latter to cut off the end of this spoke. The above-described operation for cutting off the second spoke and forming the tenon thereon is then repeated until all the spokes are finished. The above-described operation is then repeated—that is, the frame is unlocked, the arm G⁵ is swung rearward, the spindle F is moved to an extreme right-hand position, the frame G is then swung upward, the wheel is removed from the chuck B, and a new wheel is placed thereon.

As before explained, the auxiliary saw I is employed to cut off the first spoke of wheels having spokes so close together that the dished saw cannot enter between adjacent spokes. If the dished saw were brought down to cut the first spoke of a thick-set wheel, a straight cut could not be made, and besides the spoke would be cut too short and would not correspond in length with the remaining spokes cut by the dished saw on revolving the wheel after the dished saw has been brought into position between the spokes. When in working position, the auxiliary saw is tangent to the center of the arc of the dished saw, and the movement of the auxiliary saw at right angle to the plane of the wheel will result in cutting a spoke of the same length as those cut by the dished saw on the rotation of the wheel. By the employment of the auxiliary saw for cutting the first spoke and the dished saw for cutting the remainder of the spokes the spokes of a wheel of the character described can be cut off with nearly twice the rapidity, as the wheel may be rotated after the first spoke is cut by a continuous motion in one direction until all the spoke ends are severed, while in other machines for cutting the spokes of a wheel where the spokes are close together it is necessary to move a heavy portion of the machine at each operation of sawing the end of a spoke.

It is understood that for different-sized wheels it is necessary to adjust the extension A' vertically on the bed A and to adjust the chuck B longitudinally on said extension A' to bring the wheels in proper position for the saws and the cutter-heads.

Having thus fully described my invention, I claim as new and desire to secure by Letters Patent—

1. A tenoning and cut-off machine having a circular dished saw, means for rotatably supporting the wheel for the action of the dished saw, and an auxiliary saw for cutting off the first spoke of a wheel, the said auxiliary saw being in a plane tangent to the middle of the arc of the dished saw, when the latter is in a cutting position, as set forth.

2. A tenoning and cut-off machine having a circular dished saw, means for rotatably supporting the wheel for the action of the dished saw, an auxiliary circular saw for cutting off the first spoke of a wheel, the auxiliary saw being arranged in a plane tangent to the middle of the arc of the dished saw, when the latter is in a cutting position, a frame mounted to swing and in which the auxiliary saw is journaled, the frame being under the control of the operator, and means for revolving said auxiliary saw, as set forth.

3. A tenoning and cut-off machine having a circular dished saw, an auxiliary circular saw for cutting off the first spoke of a wheel, and arranged in a plane tangent to the middle of the arc of the dished saw when the latter is in a cutting position, an arm mounted to swing and in which the auxiliary saw is journaled, means under the control of the operator for swinging the arm, a segment arranged on a suitable support and engaging a guideway on the said arm, and means for revolving said auxiliary saw, as set forth.

4. A tenoning and cut-off machine having a circular dished saw, a revoluble cutter-head carrying said saw, a spindle for said cutter-head, a frame mounted to swing and in which said spindle is journaled, rests for the free end of the frame, a locking device for the frame to hold the parts in working position until all the spokes of the wheel are finished, means for counterbalancing said frame, and an auxiliary saw for cutting off the first spoke of a wheel, as set forth.

5. A tenoning and cut-off machine, comprising means for revolubly supporting a wheel, a circular dished saw, a revoluble cutter-head carrying said saw, a spindle for said cutter-head, a frame mounted to swing and in which said spindle is journaled, an auxiliary circular saw for cutting off the first spoke of a wheel and mounted to swing in a plane tangent to the center of the arc of the dished saw, and means for locking the frame carrying the dished saw in position, to hold the spindle, cutter-head and saw in an active position, as set forth.

6. A tenoning and cut-off machine having a circular dished saw, a cutter-head carrying said saw, a spindle for said cutter-head, means for shifting said spindle in direction of its length, stops for limiting the shifting of the spindle, and a device adapted to be moved in or out of the path of one of said stops, as set forth.

7. A tenoning and cut-off machine having a circular dished saw, a revoluble cutter-head carrying said saw, a spindle for said cutter-head, a frame mounted to swing and in which said spindle is journaled, means under the control of the operator and carried by said frame, to shift said spindle in the direction of its length, adjustable stops for limiting the shifting of the spindle in either direction, and a device adapted to be moved in or out of the path of one of said stops, as set forth.

8. A tenoning and cut-off machine having a swing-frame, a spindle journaled and mounted to slide in said frame, a cutter-head on said spindle, a circular dished cut-off saw on the cutter-head, means for rotating the spindle, a shifting device for shifting the spindle in the direction of its length, adjustable stops on the shifting device, for limiting the shifting of the spindle in either direction, and an arm adapted to be moved in or out of the path of one of the stops, as set forth.

9. A tenoning and cut-off machine having a circular dished saw, means for rotatably supporting the wheel for the action of the dished saw, and an auxiliary saw located below the dished saw and arranged in a plane tangent to the middle of the arc of the dished saw when the latter is in a cutting position, the said auxiliary saw being adapted to be swung upward to cut off the first spoke of a wheel, the dished saw being arranged to be swung downward and moved into position to cut off the remaining spokes when the auxiliary saw is lowered, the dished saw remaining in its lowermost position, until all the spokes are finished, as set forth.

10. A tenoning and cut-off machine having a circular dished saw, means for rotatably supporting the wheel for the action of the dished saw, and an auxiliary saw located below the dished saw and arranged in a plane tangent to the middle of the arc of the dished saw when the latter is in the cutting position, the said auxiliary saw being adapted to be swung into position to cut off the first spoke of a wheel, the dished saw being arranged to be swung downward when the auxiliary saw is moved into inactive position, and means for holding the dished saw in the lower position until the ends of the remaining spokes of the wheel are cut off, as set forth.

11. A tenoning and cut-off machine, comprising means for revolubly supporting a wheel, a device for holding the ends of the spokes while being cut, an auxiliary saw for cutting off the first spoke of a wheel, and a dished saw adapted to be brought into the space between the spokes adjacent to the cut spoke, to cut the remaining spokes as the wheel is revolved on its support, the said auxiliary saw being arranged in a plane tangent to the middle of the arc of the dished saw when the latter is in the cutting position, as set forth.

In testimony whereof I have signed my name to this specification in the presence of two subscribing witnesses.

CHARLES SEYMOUR.

Witnesses:
GEO. W. DEATRICH,
JOSEPH BAUER.